United States Patent [19]

Augeri

[11] 3,973,941
[45] Aug. 10, 1976

[54] METHOD OF PRODUCING A BLOWN BOTTLE HAVING MEANS DETERMINATIVE OF RELATIONSHIP BETWEEN THE BOTTLE BODY AND THE ANNULAR POSITION OF ASSOCIATED MEANS MOUNTED ON THE FINISH

[75] Inventor: Joseph L. Augeri, Shelton, Conn.

[73] Assignee: The Nestle Company Inc., White Plains, N.Y.

[22] Filed: Dec. 23, 1974

[21] Appl. No.: 535,281

[52] U.S. Cl. .................................. 65/79; 65/82; 65/229; 65/241; 65/323; 215/31
[51] Int. Cl.² .................... C03B 9/14; C03B 9/40
[58] Field of Search ............. 65/323, 229, 79–82, 65/241; 215/31

[56] References Cited
UNITED STATES PATENTS

| | | | |
|---|---|---|---|
| 998,824 | 7/1911 | Winder | 65/229 X |
| 1,116,523 | 11/1914 | Westlake | 215/1 |
| 1,260,637 | 3/1918 | Canfield | 65/323 X |
| 1,527,947 | 2/1925 | Woods | 65/79 |
| 2,076,551 | 4/1937 | Conner | 215/1 |
| 2,849,838 | 9/1958 | Barlett | 65/229 X |
| 2,882,818 | 4/1959 | Vowles | 101/126 |
| 3,680,763 | 8/1972 | Ludder | 215/1 |
| 3,708,274 | 1/1973 | Fleck | 65/323 X |

*Primary Examiner*—S. Leon Bashore
*Assistant Examiner*—Frank W. Miga
*Attorney, Agent, or Firm*—Watson Leavenworth Kelton & Taggart

[57] ABSTRACT

Method of producing a moulded bottle having means which determines the relationship between the bottle body and the annular position of the finish thereof or associated means, such as a closure cap, pouring spout, delivery pump, or any other desired appurtenance, that is mountable upon the finish of the blown bottle in a predetermined annular position. This method may include moulding a parison in a blank mould and forming thereon a finish that has at least one guidance indexing means, i.e., physically engageable orientation guidance means, and transferring the parison from the blank mould to a forming mould which has a moulding cavity that is of a shape to produce the hollow bottle in its desired form. This forming mould may be a blow mould that has at a particular annular orientation determining point at least one other guidance indexing means complementary to that of the finish, i.e., complementary guidance means, so that by transferring the parison and its finish to the blow mould the complementary finish and blow mould indexing or orientation guidance means may be interengaged and the parison blown in the blow mould cavity into a hollow bottle body having the desired annular orientation relative to the finish. Practice of this method makes possible and reliable the ready production of such formed bottle and the relative orientation of its finish and body, or the oriented removable mount upon its finish of any such associated means. For example, a blown bottle having a non-round body may have mounted on its finish by a simple anchoring procedure a non-round cap whereby the transverse shapes of such body and cap will have a desired predetermined orientation relationship.

4 Claims, 13 Drawing Figures

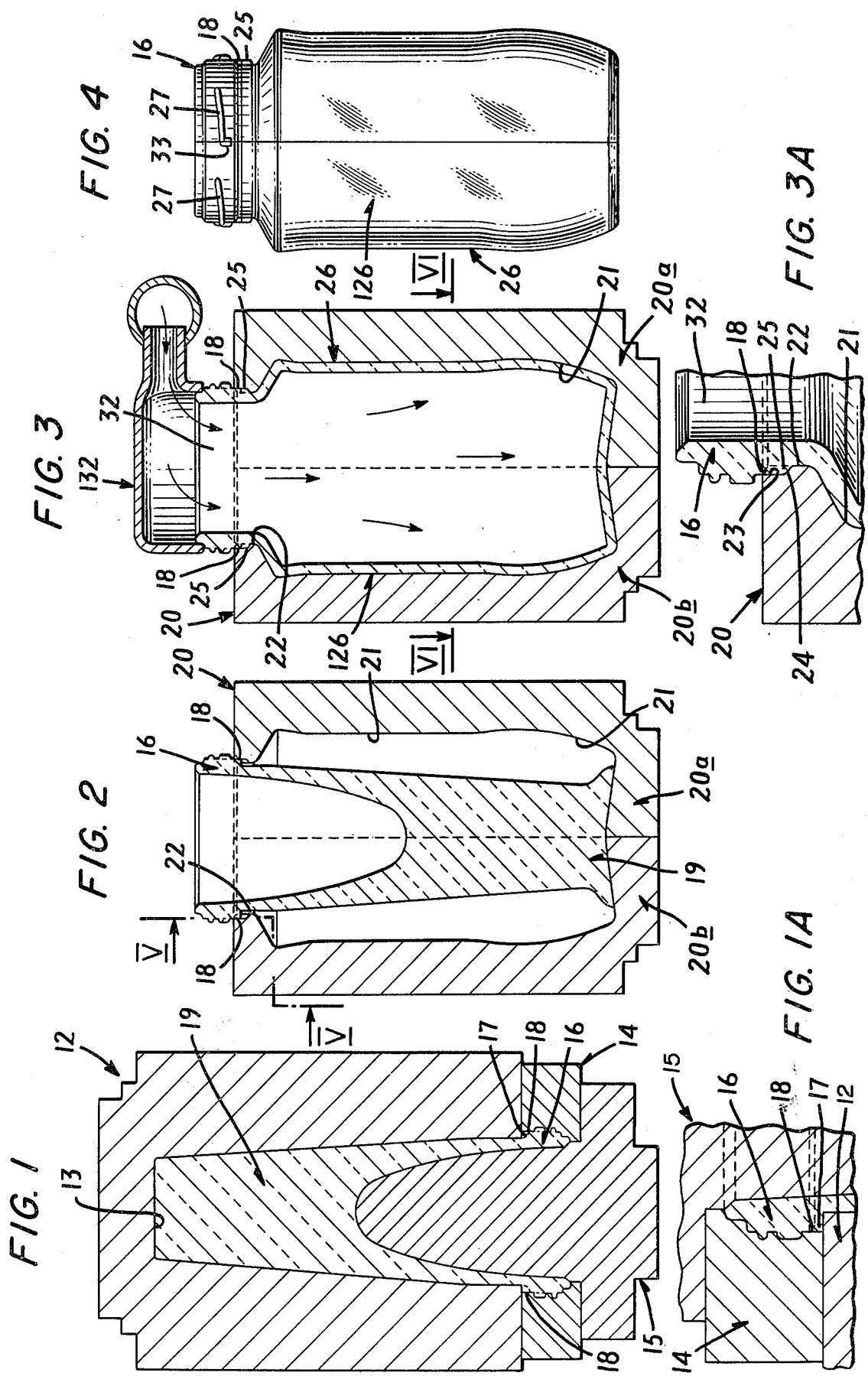

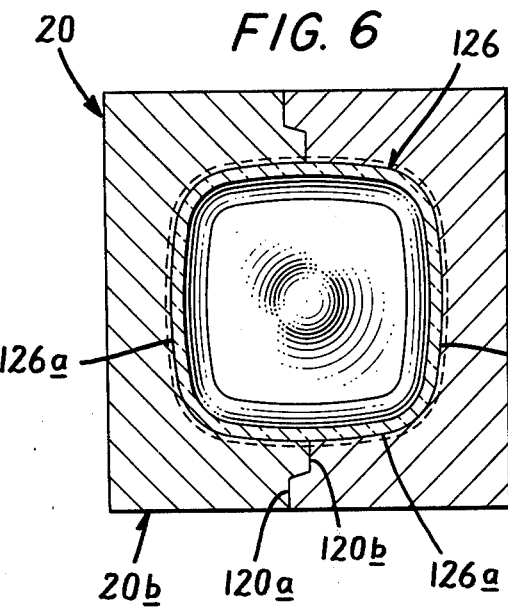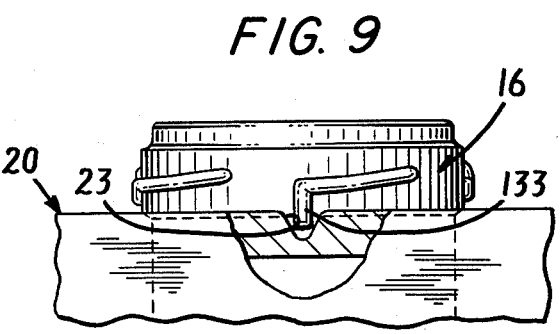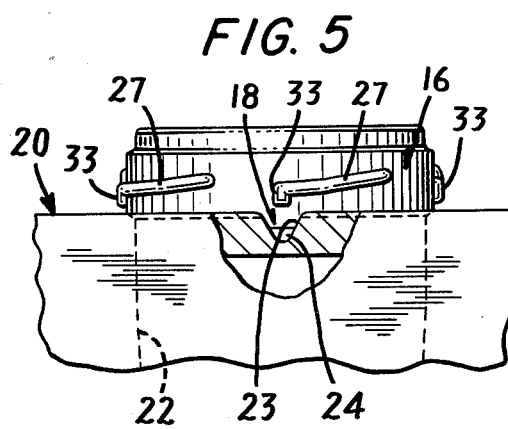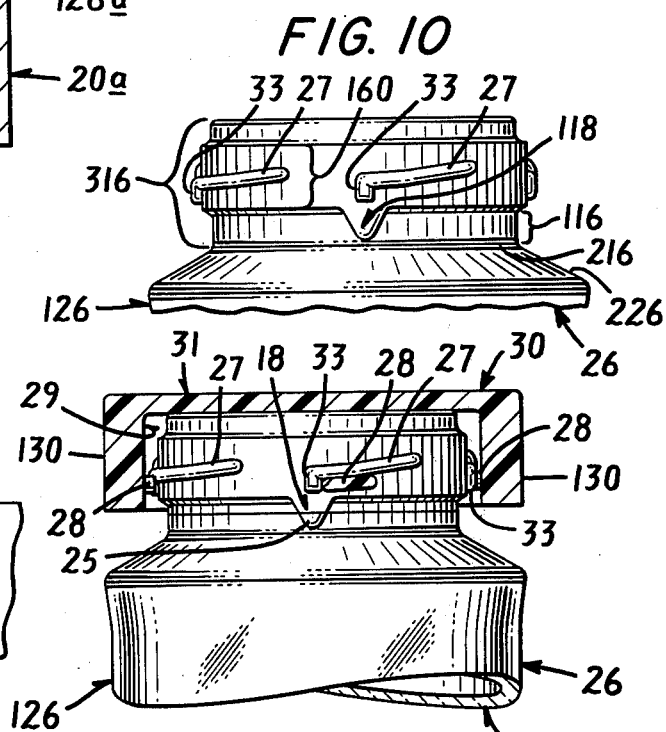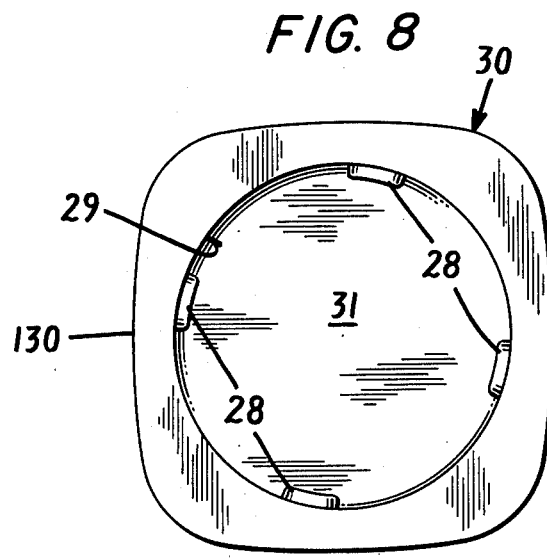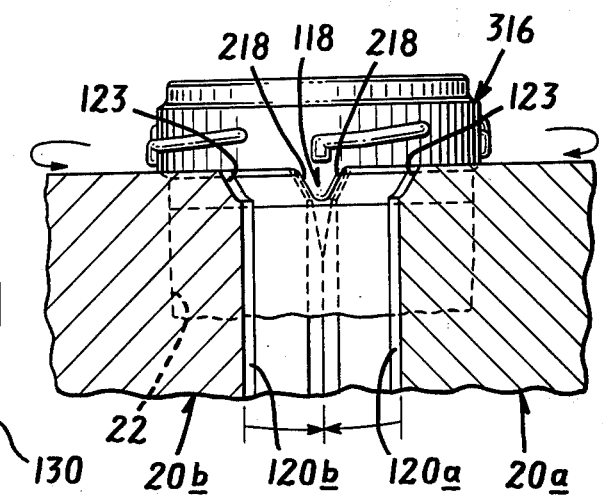

METHOD OF PRODUCING A BLOWN BOTTLE HAVING MEANS DETERMINATIVE OF RELATIONSHIP BETWEEN THE BOTTLE BODY AND THE ANNULAR POSITION OF ASSOCIATED MEANS MOUNTED ON THE FINISH

BACKGROUND OF THE INVENTION

This invention relates to a method of moulding bottles from thermoplastic material, such as glass and suitable plastics, including the use of a blank or parison mould, a forming mould, and a neck ring for moulding the finish and transferring the parison from the blank mould to the moulding cavity of the forming mould. It is also concerned with the problem of suitably or satisfactorily orienting associated means closure such as closure caps, pouring spouts, delivery pumps, or any other desired closing appurtenances, as they are anchored upon the finishes of such formed bottles in finish bore closing fashion.

SUMMARY OF THE INVENTION

The present invention employs a unique method of moulding any such bottle which includes moulding a parison in a blank mould and forming thereon a finish having at least one guidance indexing means, i.e., physically engageable orientation guidance means, then transferring the parison and its finish from the blank mould to a forming mould which has a parison receptive moulding cavity of a shape to produce the hollow bottle in its desired form, with the forming mould having at least one other guidance indexing means complementary to that of the finish, i.e., complementary guidance means, for interengagement upon such transfer. Thus, upon moulding the parison into the desired hollow bottle body within the forming mould cavity this body is automatically oriented in the desired manner relative to the finish. Consequently, when the finish is, in the moulding thereof, formed with reference means, which by way of example may be in the form of stop means to limit rotation thereof on the finish of any selected associated movable or closure means, such as a closure cap, this reference means will have a predetermined annular orientation relative to the guidance indexing means on the finish so as automatically to dictate the annular orientation of the associated means, e.g., the closure cap, relative to the hollow bottle body when this associated means is applied to the finish.

It is a general object of the invention to attain such results in a reliable production operation of a basically standardized bottle-forming machine in which, by way of example, the blank mould is inverted and receives a gob of molten thermoplastic, e.g., glass, that flows about a plunger and into a split neck ring which together close the bottom of the blank mould cavity there to form a parison having a moulded finish. In the moulding of the finish by the neck ring there is provided on the finish at predetermined annularly oriented points the reference means or stop lug and the guidance indexing means or alignment lug, i.e., orientation guidance localized protrusion, which have a definite transversely angular relationship relative to each other. The plunger is retracted and the neck ring is swung by mechanism of the machine to invert the parison to its upright position and drop it down through the open mouth of the blowing cavity of a blow mould for resting of the finish upon the annular lip of the blow mould mouth. In doing so the guidance indexing means or alignment lug, i.e., orientation guidance localized protrusion, mates with or drops down into a complementary indexing means, e.g., an alignment notch, i.e., localized recess, in this blow mould cavity mouth because the relative locations of such parts have been dictated in the predesign of the machine and the parison and its finish have remained clamped by the split neck ring from the time the latter moulded the finish to the time when it released the latter at the top of the blow mould after insertion into the blow mould cavity for blowing the hollow bottle body therein. It will thus be appreciated that the resulting blown bottle body will be closely annularly oriented relative to the reference means or stop lug on the finish, so that upon the mount of associated means, such as a closure cap, on the finish there is attained a desired relative orientation of the hollow bottle body and such mounted means or cap. This is particularly important to the production of transversely non-round hollow bottles and the mount of transversely non-round rotary caps thereon, when it is desired that the transverse shape of each of the latter is to be annularly oriented relative to that of each of the bottle bodies.

Another object of the invention is to provide on the blown bottle finish known types of anchorage means for associated structure, such as interrupted threads or camming tracks for closure caps, and stop means or lugs to limit rotary mount of such caps, while additionally providing uniquely on the finish or an adjacent transverse zone at a predetermined annular point of orientation an indexing lug, i.e., orientation guidance localized protrusion, that is to be aligned with a complementary indexing means in the mount of the blow mould cavity, such as a localized receptive recess or lug mating notch.

Other objects of the invention will in part be obvious and will in part appear from reference to the following detailed description taken in connection with the accompanying drawings, wherein like numerals identify similar parts throughout, and in which:

FIG. 1 is an axial section of a blank mould, a parison moulded in its cavity, a neck ring and a plunger closing this cavity, and a finish on the lower end of the parison as pressure moulded by the neck ring;

FIG. 1A is an inverted enlarged detail, with parts broken away, of a transverse section of one side of the finish and neck ring shown in FIG. 1;

FIG. 2 is an axial section of a blow mould, and of the parison and its finish of FIG. 1 after transfer to the blow mould cavity, showing alignment mating of indexing means on the finish with complementary indexing notches in the mouth of the blow mould cavity;

FIG. 3 is an axial section of a hollow bottle as produced in the blow mould cavity by a compressed air blowing head;

FIG. 3A is an enlarged detail, with parts broken away, of a transverse section of one side of the finish and top portion of the adjacent blow mould structure shown in FIG. 3;

FIG. 4 is a side elevation of the blown hollow bottle as produced in the blow mould of FIG. 3;

FIG. 5 is a sectional detail to enlarged scale, with parts broken away, taken substantially on line V—V of FIG. 2;

FIG. 6 is a sectional view taken substantially on line VI—VI of FIG. 3;

FIG. 7 is a side elevational view to enlarged scale, of the top portion of the bottle shown in FIG. 4, with parts broken away, showing a sectioned closure cap mounted upon the finish;

FIG. 8 is a bottom plan view of the closure cap of FIG. 7;

FIG. 9 is a sectional view similar to FIG. 5, showing a different embodiment of the indexing lug;

FIG. 10 is a side elevational view of the top portion of the blown bottle, with parts broken away, showing another embodiment of the indexing lug; and FIG. 11 is an elevational view of the top portion, including the finish upon the parison employed to produce the FIG. 10 blown bottle, and illustrating how the indexing or aligning lug may be employed to advantage in effecting proper annular orientation of the parison in the blow mould cavity as the two hinged halves of the blow mould, parts of which are illustrated in section with others broken away, are swung toward each other in closing.

As is illustrated in FIGS. 1 and 1A, the blank mould 12 is cup-shaped to provide therein a parison moulding cavity 13. Preferably this blank mould is inverted, as shown, to adapt it to blown bottle production in a certain type of bottle-forming machine which employs a finish moulding neck ring 14, preferably split, for transfer purposes. This neck ring 14 and a pressing plunger 15 together effectively close the bottom of the parison moulding cavity 13, after a gob of molten thermoplastic material is placed therein. It is to be understood that the split neck ring 14 and opposed circular transverse portion of the plunger 15 define therebetween an annular channel in which the finish 16 is moulded to its final form. It will be best understood from FIG. 1A that at 17 a localized indentation is provided in the annular exterior face of the neck ring, so that molten thermoplastic will flow thereinto in order to provide a localized indexing lug 18, i.e., orientation guidance localized protrusion thereat, and that it may be desirable to duplicate this structure diametrically of the finish annulus 16.

The split neck ring 14, in completing the final form of the finish 16, will remain in its position about this moulded finish, so that upon removal of the plunger 15, the parison cup-shaped body 19 may be withdrawn by such neck ring, swung over in the usual manner to invert the parison to an upright position, and then by release of the finish ring the parison is placed into the blow moulding cavity of a blow mould. Such a blow mould 20 is illustrated in FIG. 2 as being provided with a blow moulding cavity 21 having a mouth 22 down through which the hot thermoplastic parison 19 is dropped to spread out into a shape which may be similar to that illustrated therein. It will be noted that the blow mould 20 is formed of two halves of allochiral construction with these being referenced respectively 20a and 20b.

As will be seen from FIG. 3A and FIG. 5, the blow mould cavity mouth 22 is provided with an indexing means in the form of an inverted wedge-shaped guidance notch 23, which is complementary to the other indexing means, in the form of the depending lug 18 which extends down to the bottom of the finish zone, so that this lug's somewhat spade shape and the notch sides assure aligning insertion of this lug into this guidance notch upon dropping of the parison into the blow mould cavity. However, preferably both sides of this spade-shaped aligning lug 18 and/or the sides of the receiving notch 23 are convergingly arranged relative to each other to insure proper relative alignment in a vertical direction. Since this guidance indexing means is duplicated on the diametrically opposite side of the finish ring 16, two pairs of such aligning devices are provided for supplemental attainment of the desired annular orientation of the finish 16 within the mouth 22 of the blow mould cavity 21.

Compressed air is applied through the finish bore 32 to the parison cavity by a blowing head 132 in a conventional manner. In so blowing the bottle body 126 the unfilled bottom portion 24 of notch 23 below such alignment lug 18 will be filled in at 25 with a blob of the molten glass to merge with lug 18, as will be seen from FIGS. 3, 3A, 5, and 7. Since this addition of a blob 25 does not occur until the desired relative orienting alignment is obtained, such triangular tip end of such lug 18 merely serves to provide the latter with a pleasing ornamental appearance in the finished blown bottle 26.

It will be understood from FIGS. 3, 3A, 4, 5, 7, and 8 that the finish will also be provided in the moulding thereof by the split neck ring 14 with engaging means for anchoring movable associated means, such as a plurality of thread sections 27 that are obliquely arranged for camming engagement therebelow of suitable internal cap lugs 28 which may be annularly distributed at equal radial angles about the socket 29 of the cap 30. It will also be understood from FIG. 7 that the anchoring cap lugs 28 will be so placed annularly and axially relative to such interrupted thread sections 27 as to assure that the end wall 31 of the cap 30, or a disc liner therein, will securely close the finish bore 32 securely. The leading edges of such cap lugs 28 jam against stop means in the form of depending forward ends 33 of such thread sections, as may be best understood from FIG. 7.

As is indicated in FIG. 6, it may be desirable that the blown bottle body 126 be of a transversely polygonal or substantially square form. In such case, it may also be desired to have the transverse shape of the exterior of the cap 30 of similar non-round shape for similar alignment matching when the closure cap is securely anchored in its final position. For this purpose, the relative dimensions of the finish height, the cap socket depth, the locations of the stop lugs 33 on the finish 16, the relative annular orientation of such stop lugs, and the indexing lugs 18, i.e., orientation guidance localized protrusions thereat, are all so interrelated as to assure that when the cap 30 is rotatably tightened upon the finish to engagement of the leading edges of the cap lugs 28 against the stop lugs 33, the finish bore 32 will be securely closed and the non-round sides 130 of the cap will be substantially aligned with the similarly shaped non-round side panels 126a of the blown throttle body 126. Such proportional dimensions may be chosen in a fashion so that such secure closure of the finish bore 32 is attained when the stop lugs 33 check the forward rotary motion of the cap lugs 28 and with these stop lugs substantially aligned with the reference or indexing lugs 18 of the finish, as will be best understood in FIG. 7. Further, it will be seen from FIGS. 2, 3, and 4 that a pair of such stop lugs 33 may be arranged in the axial plane of the opposed meeting faces 120a and 120b of the blow mould halves 20a and 20b while the other diametrical pair of such stop lugs will be arranged in an axial plane which is at right angles to or at 90° from the first mentioned axial plane, with the second such axial plane also having substantially aligned therein the pair of indexing or aligning lugs 18.

In another embodiment of such blown throttle, the indexing lugs may be provided by depending elongations of the diametrically located pair of the stop lugs, such as is indicated at 133 in FIG. 9. It will also be noted therein that the wedge-shaped alignment notch 23 in the mouth 22 of the blow mould cavity 21 has converging sides to serve as oblique camming surfaces for substantially accurate alignment therein of the bottom end of the combined stop and indexing lugs 133.

It will further be understood from FIG. 10 that in the event the split neck ring is of sufficient vertical width as to finish mould integrally substantially all of the neck zone with the annular mid zone 160 of the finish which carries the interrupted thread sections 27, the alignment lug 118 may be moulded with such neck ring which by way of example may be in the shape of an inverted isosceles triangle so as snugly to fit and seat within the entire indexing notch 23. This greater depth of finish 316 is illustrated in FIG. 10 as including neck zone 116 down to the mergence base line 216 thereof with the shoulder 226 of the blown bottle body 126. Consequently, a mergence section intervenes the body section 126 and the finish ring annular land 160 on which the thread sections 27 and stop lugs 33 are provided. The term "mergence section" as used herein is employed in the sense that it includes all of a transverse zone of the blown throttle which may intervene the body section and the portion of the circular finish that is equipped with the anchoring means, e.g., thread means, for the removable associated means or closure cap, and may thus include a neck portion or merely a merged joint between such finish portion and body section as well as intervening variants.

It is graphically indicated in FIG. 11 that the two opposed halves 20a and 20b of the blow mould 20 may have their opposed meeting faces 120a and 120b substantially arranged along or in a vertical axial plane which is in substantial alignment with the guidance indexing lug 18, or 118, on the finish, i.e., the orientation guidance localized protrusion thereon. In transferring by means of the split neck ring 14 a parison for such a finish 316, the depending and integral indexing lug 118 will have its downwardly converging sides 218 opposed opposite oblique sides 123 of a composite notch to be defined thereby within the mouth 22 of the blow mould cavity. It is indicated in FIG. 11 that with the swing together of the opposed faces of such blow mould halves, the oblique notch side faces 123 together define a mating notch into which the index lug 118 is medially aligned. Such a variation may be useful in situations where for some reasons the forming machine is of a nature that it does not assure automatically the vertical alignment of such an index lug with a blow mould mating notch as the parison and its finish are transferred respectively by the neck ring to the blow mould cavity and the top of this mould. Such camming action can be relied upon to so rotate the finish ring with its depending parison either clockwise or counterclockwise as may be necessary upon hinged closure of the blow mould halves to encompass the parison in its cavity below the finish ring which is otherwise rotatably supported on the top of the blow mould.

Basically, the method of the present invention is of unique usefulness in the production of a bottle having means determinative of the relationship between the orientation of the body of the bottle and the annular position of the finish of the bottle. This method includes moulding a parison in a blank mould and forming a finish thereon which has at least one guidance indexing means, e.g., an orientation guidance localized protrusion. It further includes transferring the parison to a forming mould having a moulding cavity of a shape to produce the hollow bottle in its desired form or shape. The forming mould has at a particular orientation determining point at least one other guidance indexing means, e.g., orientation guidance localized recess, complementary to that of said finish for interengagement thereof when the parison is transferred to the forming mould cavity. These complementary indexing means of the finish and forming mould are interengaged and then the hollow bottle body is moulded in the forming mould cavity, whereby the annular orientation of the bottle body relative to the annular orientation of the finish is of the desired predetermined relationship. By this procedure non-round finishes and/or transversely non-round hollow bottle bodies may be matched in a desired manner, and in turn this relationship can assure by stop means on the finish and cooperative stop means on round or non-round closure caps that desired annular orientation of the latter relative to the non-round bottle bodies automatically is attained whether their finishes are circular or are non-round.

It will thus be seen that the objects set forth above, among those made apparent from the preceding description, are efficiently attained and, since certain changes may be made in carrying out the above method and in the device set forth without departing from the scope of the invention, it is intended that all matter contained in the above description or shown in the accompanying drawings shall be interpreted as illustrative and not in a limiting sense.

Having described my invention, what I claim as new and desire to secure by Letters Patent is the novel subjects matter defined in the following claims:

1. A method of producing a hollow bottle having a mouth-defining finish adapted to receive and carry closure means, such as a cap, in a particular annularly oriented position thereon, comprising
   1. moulding a parison and a finish thereon in a parison forming and ring moulding means with the formation on the finish of physically engageable orientation guidance means at a predetermined annular location that will be related in an intended manner to the closure means oriented position and whereby it will subsequently serve to be physically engageable with complementary orientation guidance means of additional moulding equipment and thereby dictate the desired relative annular orientation thereof;
   2. transferring the parison and its finish with the latter carrying its orientation guidance means to a forming mould having a body portion cavity receiving the parison to shape the bottle body therein and with the finish orientation guidance means engaging a complementary orientation guidance means at a particular annular location in the mouth of this mould cavity; and
   3. while maintaining the engagement of the pair of complementary orientation guidance means moulding the parison in this body portion cavity into the hollow bottle, whereby the latter and the closure means when mounted on the finish in its particularly desired oriented position are annularly oriented relative to each other in the desired manner.

2. The steps of the method defined in claim 1 and additionally providing in the moulding of the parison and finish the formation on the finish of the first orientation guidance means as a localized protrusion, and in the transfer of the parison and its finish to the forming mould engaging this protrusion into a localized recess in the mouth of the forming mould cavity as the complementary orientation guidance means.

3. The steps of the method defined in claim 2 and additionally providing at least one of the localized recess in the mouth of the forming mould cavity and the localized protrusion on the finish with an oblique annularly-directed side surface whereby the protrusion is cammed into desired alignment within the recess in transferring the parison and its finish into the forming mould cavity.

4. The method of producing a blown hollow bottle having a body of a certain desired non-round transverse sectional shape and a mouth-defining finish adapted to receive and carry a closure cap of similar non-round transverse shape in a particular annularly oriented position thereon which will substantially align their similar non-round transverse shapes, comprising
1. moulding a parison and a circular finish thereon in a parison forming and ring moulding means while forming on the finish a rotary cap stop means, and on the finish and an adjacent mergence section of the parison at a predetermined annular location related in a certain orienting manner to the location of the cap stop means also forming at the same time an exterior and laterally-projecting, localized, physically engageable orientation guidance protrusion whereby it will subsequently serve to be physically engageable with complementary, localized orientation guidance means of additional moulding equipment for dictating the desired relative annular orientation thereof;
2. transferring the parison and its finish with the orientation protrusion carried thereby to a blow mould having a non-round moulding cavity that is of a transverse shape to produce the transversely non-round hollow bottle body with the orientation protrusion engaging in a complementary localized orientation recess in the mouth of the moulding cavity; and
3. while maintaining the engagement of the orientation protrusion in the orientation recess moulding the parison in this moulding cavity into the desired non-round hollow body, whereby the latter and the closure cap when mounted on the finish in its desired particular annularly oriented position thereon have their similar non-round transverse shapes substantially aligned.

* * * * *

UNITED STATES PATENT AND TRADEMARK OFFICE
CERTIFICATE OF CORRECTION

PATENT NO. : 3,973,941
DATED : AUGUST 10, 1976
INVENTOR(S) : JOSEPH L. AUGERI

It is certified that error appears in the above-identified patent and that said Letters Patent are hereby corrected as shown below:

Column 1, line 16, for "means closure" read --closure means--. Column 4, lines 51 and 52, and line 67, for "throttle" read --bottle--. Column 5, line 7, for "lugs 133" read --lug 133-- and line 25, for "throttle" read --bottle--.

Signed and Sealed this

Twelfth Day of October 1976

[SEAL]

Attest:

RUTH C. MASON
*Attesting Officer*

C. MARSHALL DANN
*Commissioner of Patents and Trademarks*